Figure 1:
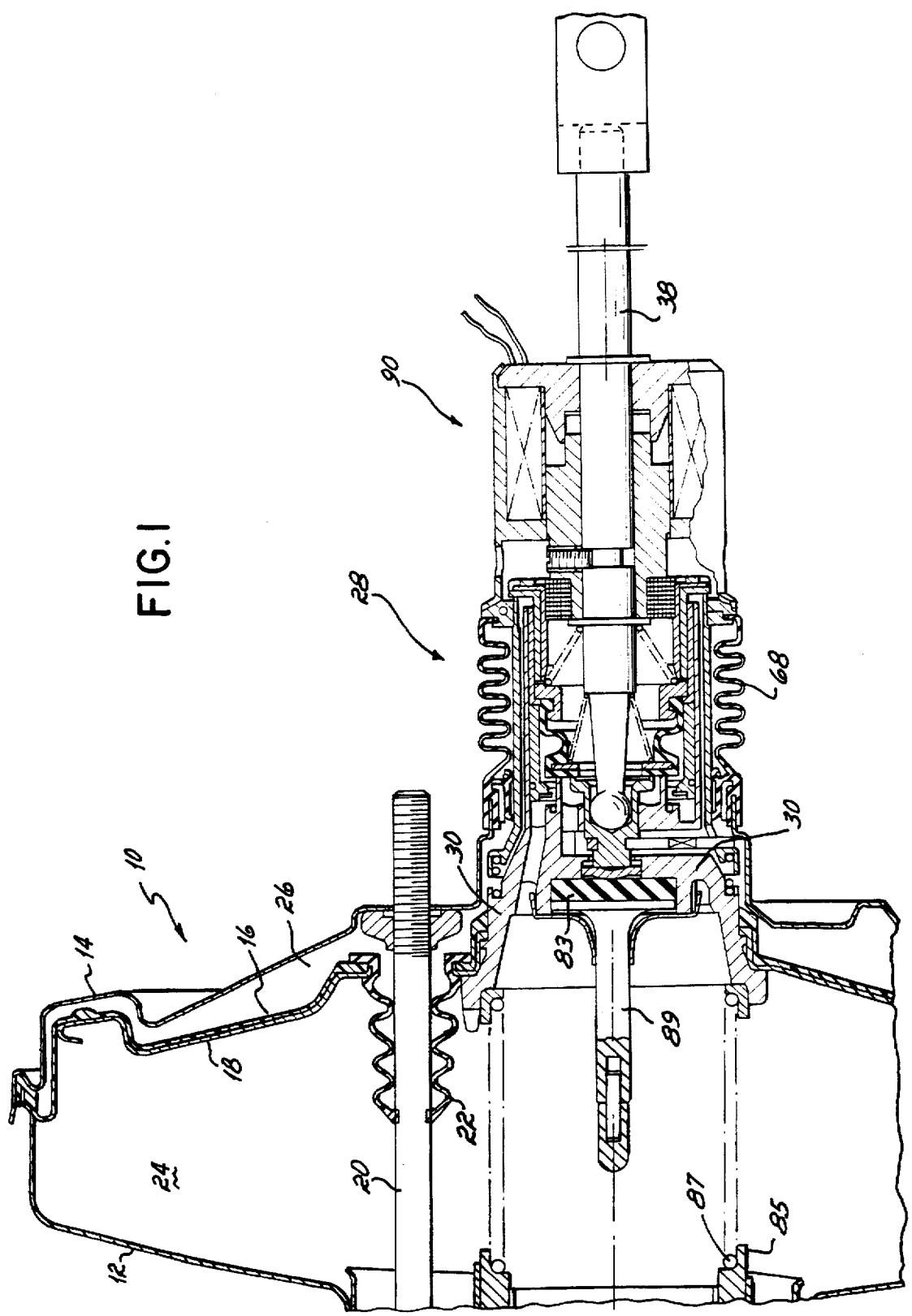

United States Patent [19]

Mohr

[11] Patent Number: 5,735,581
[45] Date of Patent: Apr. 7, 1998

[54] VALVE ASSEMBLY FOR CONTROLLING A PNEUMATIC BRAKE BOOSTER WITH AN ELECTROMAGNETIC ACTUATION MEANS

[75] Inventor: Kurt Mohr, Halsenbach-Ehr, Germany

[73] Assignee: Lucas Industries public, Solihull, United Kingdom

[21] Appl. No.: 704,662

[22] PCT Filed: Mar. 14, 1996

[86] PCT No.: PCT/EP95/00954

§ 371 Date: Sep. 12, 1996

§ 102(e) Date: Sep. 12, 1996

[87] PCT Pub. No.: WO95/26289

PCT Pub. Date: Oct. 5, 1995

[30] Foreign Application Priority Data

Mar. 28, 1994 [DE] Germany .................. 44 10 769.2

[51] Int. Cl.[6] .................. B60T 13/66; B60T 13/57; F15B 9/12; F15B 13/044
[52] U.S. Cl. .................. 303/114.3; 188/356
[58] Field of Search ........... 303/113.4, 114.3, 303/113.3, 113.2, 125, 135, 119.2; 91/369.1–369.4, 376 R; 188/356, 357; 60/545; 180/167, 169

[56] References Cited

U.S. PATENT DOCUMENTS

| | | | |
|---|---|---|---|
| 3,795,426 | 3/1974 | Sisson | 303/114.3 |
| 4,608,825 | 9/1986 | Fontaine | |
| 4,819,996 | 4/1989 | Belart et al. | 303/114.3 |
| 5,172,964 | 12/1992 | Levrai et al. | 303/113.3 |
| 5,178,441 | 1/1993 | Heibel et al. | 303/114.3 |
| 5,312,173 | 5/1994 | Rossigno | 303/113.3 |
| 5,338,107 | 8/1994 | Rossigno et al. | 188/356 |
| 5,350,224 | 9/1994 | Nell et al. | 188/356 |
| 5,427,442 | 6/1995 | Heibel | 303/114.3 |
| 5,437,217 | 8/1995 | Castel et al. | 91/376 R |
| 5,460,074 | 10/1995 | Balz et al. | 303/114.3 |
| 5,479,844 | 1/1996 | Heibel et al. | 303/114.3 |
| 5,513,906 | 5/1996 | Steiner | 188/356 |
| 5,518,305 | 5/1996 | Jakobi et al. | 303/114.3 |
| 5,551,764 | 9/1996 | Kircher et al. | 303/113.4 |
| 5,590,937 | 1/1997 | Heibel | 303/125 |

FOREIGN PATENT DOCUMENTS

| | | |
|---|---|---|
| 0405603 | 1/1991 | European Pat. Off. |
| 0478396 | 7/1991 | European Pat. Off. |
| 0505603 | 9/1993 | European Pat. Off. |
| 3920766 | 1/1991 | Germany |
| 9202154 | 5/1992 | Germany |
| 4211849 | 10/1993 | Germany |
| 4217409 | 12/1993 | Germany |
| 4309850 | 9/1994 | Germany |
| 60-92151 | 5/1985 | Japan ............ 303/113.3 |

*Primary Examiner*—Douglas C. Butler
*Attorney, Agent, or Firm*—Wood, Herron and Evans, L.L.P.

[57] ABSTRACT

A valve assembly for controlling a pneumatic brake booster (10) comprises a control housing (30) in which a first and a second valve seat (32, 34) are arranged. A valve body (40) is adapted to contact both valve seats. The brake booster (10) is provided with two chambers (24 26) in the usual manner, one chamber (24) of which can be evacuated while the other chamber (26) can be supplied with pressurized air. An additional valve seat (66) is provided. The additional valve seat (66) can be opened by a sleeve (72) which radially surrounds the control housing (30) of the brake booster, in order to form an additional ventilation duct (80) to one of the two chambers. The sleeve (72) can be actuated mechanically and/or electromagnetically by an electromagnetic actuation device (90).

6 Claims, 2 Drawing Sheets

1

VALVE ASSEMBLY FOR CONTROLLING A PNEUMATIC BRAKE BOOSTER WITH AN ELECTROMAGNETIC ACTUATION MEANS

This application is a continuation of PCT Application PCT/EP95/00954 filed Mar. 14, 1995 which in turn is based on German Application No P4410769.2 filed Mar. 28, 1994.

The invention relates to a valve assembly for controlling a pneumatic brake booster, which comprises the characteristics of the preamble of claim 1.

A valve assembly of such a type is known from EP-0 405 603 A2.

With this state of the art the valve assembly which controls the brake booster is designed in such a manner that the brake booster assists emergency braking operations very effectively but, under "normal" braking conditions, does not behave in a manner which is considerably different from the usual manner. The term "emergency braking operation" is defined as a very strong, abruptly starting pedal actuation on the part of the driver, whereas a "normal" braking operation takes place when the driver actuates the brake pedal gently. An emergency braking operation is sometimes also referred to as "panic braking". It is known that most drivers actuate the pedal too timidly when carrying out panic braking operations such as these and do not dare to fully press down the pedal. The initially mentioned state of the art according to EP-0 405 603 A2 provides a remedy for this problem in that the brake booster is equipped with a special valve assembly to provide for additional and increased brake boosting which becomes effective upon a heavy braking operation.

With this state of the art, an additional valve is provided in addition to the usual two valve seats, which comprises a sleeve which encompasses the control housing at a radial distance and which is axially movable with respect to the control housing. The sleeve is biased towards the valve seat of the additional valve, and an additional ventilation duct is formed between the sleeve and the control housing via which the overpressure chamber of the brake booster is supplied with air.

This state of the art involves a purely mechanical actuation of the valve assembly in response to an actuation of the brake pedal (by the driver).

From the state of the art it is also already known to provide an electromagnetic actuation for brake boosters in addition to the mechanical actuation, by means of which under certain braking situations a higher air pressure than under "normal" braking situations is generated very rapidly in the over-pressure chamber of the brake booster (the term "overpressure" means that a higher air pressure prevails in said chamber than in the evacuated chamber). Such electromagnetically operated auxiliary air control systems are known from DE 4 217 409 A1, DE 4 309 850 A1 and DE-GM 9 202 154. From EP 0 478 396 A1 a pneumatic brake booster with a housing is known which is divided into a vacuum chamber and a working chamber, with a double valve arrangement with a first valve between the vacuum chamber and the working chamber and a second valve between the atmosphere and the working chamber being arranged at the housing. In a rest position, the valve arrangement enables a pressure level in the vacuum chamber and in the working chamber which is isolated from atmosphere; in a working position, it keeps the vacuum chamber closed and enables a connection between the atmosphere and the working chamber. Under normal operating conditions, this brake booster can be actuated by means of an actuation rod. However, this arrangement is disadvantageous in that when the pedal is not actuated, automatic braking as a result of activation of the solenoid is not possible because the large axial movability of the valve housing relative to the actuation rod and the comparatively smaller possible opening stroke of the valve between the working chamber and the atmosphere makes effective closing of the working chamber against the vacuum chamber unachievable over the entire stroke of the valve housing.

From DE 42 11 849 A1 a brake booster is known which can be controlled in a particularly sensitive manner by means of small movements of the actuation member. To this end, this arrangement is provided with a stop member which is attached to a piston arranged between an actuation member and a power output member which extends with an axial clearance through a recess of a valve body and which, outside of it, is capable of bearing against a stop secured at the housing, thus offering the possibility of electromagnetically actuating the valve body in any position of the piston, i.e. also starting from the rest position, without affecting the exact positioning of the valve body in its rest position.

The present invention is based on the object to design a valve assembly for controlling a pneumatic brake booster in such a manner that with the minimum constructional effort a further electromagnetic actuation of the brake booster, over and above mechanically initiated additional brake boosting, is made possible in the case of emergency braking operations.

The solution of this object according to the invention is characterized in claim 1. The sleeve provided in the above-mentioned state of the art will therefore, upon an actuation of the brake pedal in the case of an emergency braking, not only be moved mechanically into a position in which auxiliary air is introduced into a chamber of the brake booster, but it is also possible to initiate a sleeve movement by means of an electric signal. The brake booster can thus also be controlled by electric signals independent of and/or dependent on a braking operation which is initiated by means of a pedal actuation. For this purpose, the invention suggests an arrangement which is of simple design and functional reliability.

According to a preferred embodiment of the invention, the electromagnetic actuation means comprises an armature which is connected with the mechanical actuation member (which is coupled with the brake pedal).

Another preferred embodiment of the valve assembly according to the invention provides a solenoid of the electromagnetic actuation means, which concentrically encompasses the mechanical actuation member of the brake booster and a solenoid housing which is movable relative to the actuation member in order to move the sleeve.

Yet another preferred embodiment of the valve assembly according to the invention provides the arrangement of a sealing sleeve in the control housing, which upon opening of a third valve seat by means of the electromagnetic actuation means prevents a ventilation of the evacuated chamber of the brake booster.

Figure 2:
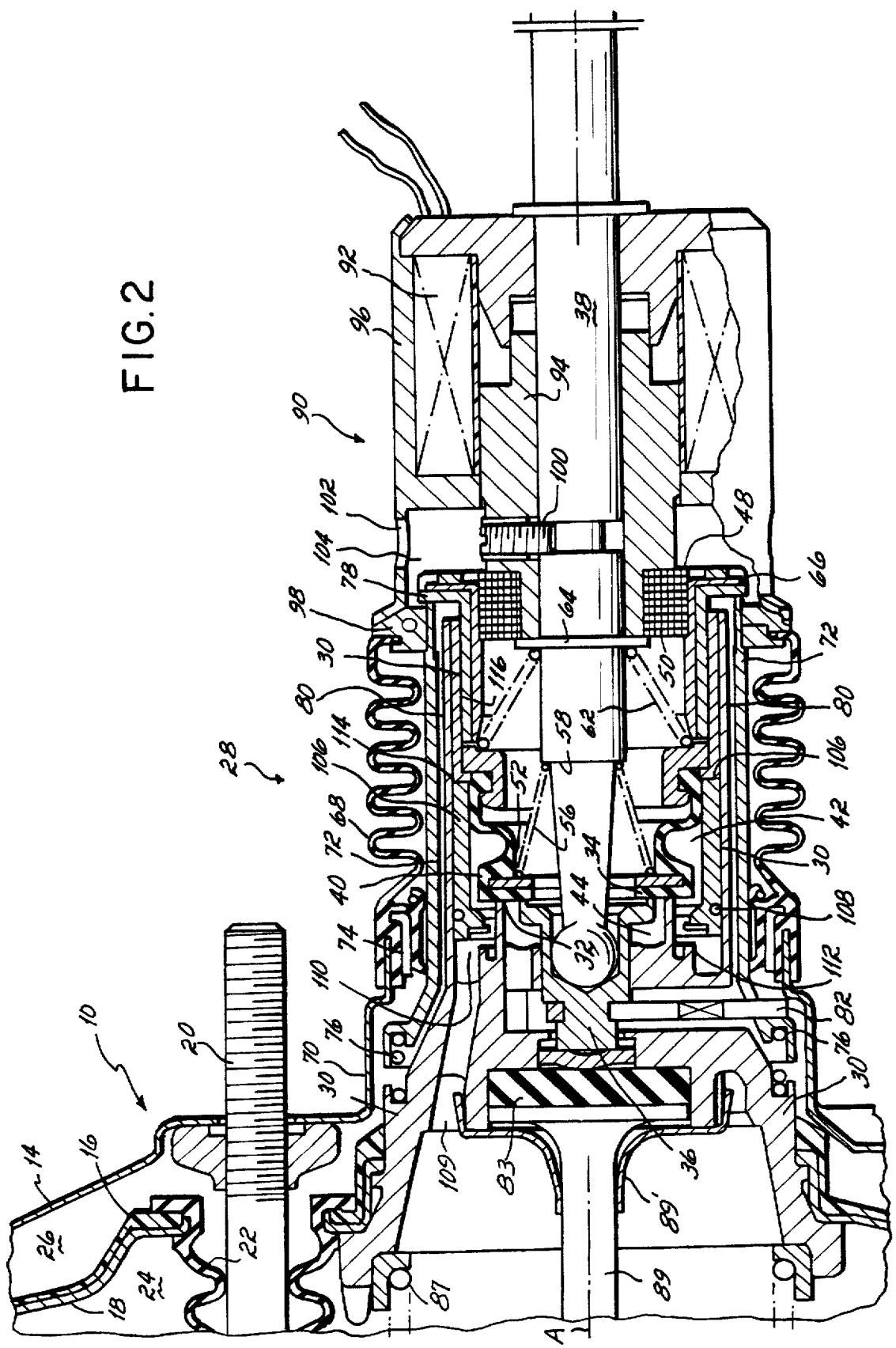

In the following, an embodiment of the invention will be described in more detail with reference to the drawings in which:

FIG. 1 schematically shows a brake booster with a valve assembly for controlling same, including an electromagnetic actuation means; and FIG. 2 shows the valve assembly, including the electromagnetic actuation means drawn to a larger scale.

In the following description of details of the invention, knowledge of the initially mentioned EP-0 405 603 is assumed, the disclosure of which is included explicitly herein.

FIGS. 1 and 2 show a brake booster 10 with two housing parts 12 and 14 which are essentially designed in a rotation-symmetrical way with respect to an axis A and which, at their outer margin, clamp a diaphragm 16 between them. The diaphragm 16 together with a rigid support plate 18 forms a movable wall through which connecting rods 20 extend parallel to the axis A, which connect the housing parts 12 and 14 and which are sealed against the movable wall 16, 18 by means of one bellows 22 each. The movable wall 16, 18 separates two chambers 24 and 26 from each other, of which the chamber 24, which is the front chamber in the normal intallation position of the brake booster, is permanently connected with a vacuum source, for example, with the suction line of a spark ignition engine, while the rear chamber 26 can optionally be connected with the front chamber 24 or with the ambient atmosphere via a valve assembly 28.

The valve assembly 28 comprises a tubular control housing 30 which is essentially designed in a rotation-symmetrical way with respect to the axis A and which is securely and sealingly connected with the movable wall 16, 18. An annular first valve seat 32 is formed in the control housing 30.

A second valve seat 34, which is also of annular shape and which has a smaller diameter, is formed coaxially with the first valve seat 32 at a tappet 36 which is adjustable along the axis A by means of an actuation member 38. The actuation member 38 can be connected in the usual manner with the brake pedal (not shown) of a motor vehicle.

Both valve seats 32, 34 are assigned a common valve body 40 which, in cooperation with the first valve seat 32, is capable of separating a radial outer annular space 42 in the control housing 30 from an annular intermediate space 44 between the two valve seats, and which in cooperation with the second valve seat 34 is capable of separating an inner space 46 from the intermediate space 44. The radial outer annular space 42 is connected with the front chamber 24, the annular intermediate space 44 is connected with the rear chamber 26. The inner space 46 permanently communicates with the ambient atmosphere via a filter 48 so that air can flow into the control housing 30 via an air inlet 50.

The valve body 40 is connected via a packing 52 made of rubber or an elastomer with a support ring 54 which is sealingly and securely installed in the control housing 30. A first conical spring 56 which bears against a shoulder 58 of the actuation member 38 biases the valve body 40 towards the two valve seats 32 and 34. The support ring 54 is located in a step 114 of a closing sleeve 106 which will be described later, where it is retained by means of a spring 62 which bears against a lock ring 64 of the actuation member 38.

A bellows 68 is fastened at a collar 70 of the housing part 14. In this manner, an annular space which surrounds the control housing 30 is protected against the ingress of dirt and unfiltered air. Within said annular space a sleeve 72 is arranged which is sealed against the collar 70 of the housing part 14 by means of a sealing ring 74 without impeding its movement along the axis A. The sleeve 72 is biased in a rearward direction, i.e. towards the third valve seat 66, by a spring 76 which bears against the housing part 14 and together with its rear end 78 forms another valve body which is normally sealed against a third valve seat 66. Between the control housing 30 and the sleeve 72 an essentially cylindrical annular space is left free which forms an additional ventilation duct 80 into the rear chamber 26.

The tappet 36 has an annular groove into which an approximately hairpin-shaped transmission member 82 is engaged securely and in a clearance-free manner. The transmission member 82 extends radially from the tappet 36 through a recess in the control housing 30 and a recess in the sleeve 72 to approximatey the inner wall of the collar 70. There, an annular stop is attached which limits the movements of the transmission member 82 and thus of the tappet 36 in a rearward direction.

In the front end area of the control housing 30 a power output member 89 is attached by means of a bracket 89'. Between the tappet 36 and the power output member 89 an elastomer body 83 is arranged which, furthermore, is encompassed by the control housing 30 and which forms a power multiplier between the actuation member 38 and the power output member 89. The entire assembly, including the movable wall 16, 18 and the control housing 30, is biased to the rear, i.e. to the right in FIG. 2, by a return spring 87.

As long as the specified vacuum is not effective in the front chamber 24 of the brake booster 10, e.g. prior to starting the engine of the motor vehicle, the movable parts of the brake booster 10 and the valve assembly 28 assume the position as shown in FIG. 2. The valve body 40 contacts the first valve seat 32, but not the second valve seat 34; the additional valve formed by the sleeve 72 and the third valve seat 66 is open. The rear chamber 26 is therefore connected with the ambient atmosphere both via the inner space 46 of the control housing 30 and via the additional ventilation duct 80. The connection between the two chambers 24 and 26 is interrupted.

If, for example, by starting the afore-mentioned spark ignition engine, a vacuum is generated in the front chamber 24, the movable wall 16, 18 together with the control housing 30 is moved in a forward direction by a small distance against the initially low resistance of the return spring 87, whereas the actuation member 38 including the tappet 36 maintains its rest position. The valve body 40, which previously contacted only the first valve seat 32, now therefore lightly contacts the second valve seat 34, and the third valve seat 66 contacts the end 78 of the sleeve 72 which also maintains its rest position. An equilibrium condition is obtained in which the front chamber 24 is evacuated to an extent which is determined by the vacuum source and in which a pressure prevails in the rear chamber 26 which is slightly higher than the pressure in the front chamber 24 but significantly lower than the atmospheric pressure. The brake booster 10 is now ready to actuate, without any further delay, a master cylinder (not shown) upon which the power output member 89 acts in the usual manner.

As soon as the brake pedal is actuated in the normal manner (i.e. not in an abrupt panic braking operation) and the actuation member 38 moved forward by a small distance (in the figures to the left), the second valve seat 34 clears the valve body 40. This now contacts exclusively the first valve seat 32 with the full force of the first conical spring 56, whereby the two chambers 24 and 26 are separated from each other in a perfectly sealed manner, while ambient air which is drawn in through the filter 48 reaches the rear chamber 26 via the inner space 46 and the annular intermediate space 44 and moves the movable wall 16, 18 together with the control housing 30 and the power output member 89 in a forward direction, thereby actuating the connected master cylinder (not shown). In the meantime, the tight contact of the third valve seat 66 at the rear end 78 of the sleeve 72 is maintained so that the additional ventilation duct 80 remains ineffective.

If, however, the brake pedal is actuated abruptly and with utmost force, thus causing the the tappet 36 to be moved further in a forward direction via the actuation member 38, the transmission member 82 contacts a front edge of a recess in the sleeve 72, driving it to the front (to the left) so that the rear end 78 of the sleeve 72 is lifted off the third valve seat 66. This results in ambient air not only flowing from the radial inner area of the filter 48 through the inner space 46 and further through the intermediate space 44 into the rear chamber 26, but also in additional ambient air flowing through the radial outer area of the filter 48 and further through the additional ventilation duct 80 into the rear chamber 26 too, so that the pressure prevailing therein very rapidly adapts itself to the ambient pressure and the movable wall 16, 18 together with the power output member 89 is moved correspondingly rapidly in a forward direction.

This function of the valve assembly as described hereinbefore can also be found in EP-0 405 603 A2 mentioned previously.

Moreover, at the pedal-side end of the booster neck 70 an electromagnetic actuation means 90 is now provided which offers another possibility of actuating the above-described valve assembly. The electromagnetic actuation means 90 comprises a solenoid 92. An armature 94 is securely connected to the actuation member 38 of the brake booster by means of a screw 100 (grub screw). In this embodiment the armature 94 is thus stationary with respect to the actuation member 38. A housing 96 of the electromagnetic actuation means 90 encompasses the solenoid 92. The housing 96 is connected with the sleeve 72 by means of a retaining ring 98 in a sealing and rigid manner. The bellows 68, too, is securely connected to the retaining ring 98. The housing 96 of the electromagnetic actuation means 90 is provided with an opening 102 into which a duct 104 opens which, at its other end, is connected to the filter 48 or the associated air inlet 50, respectively.

A closing sleeve 106 is arranged in the control housing 30. The function of the closing sleeve 106 is to prevent an open connection 109 to the vacuum chamber 24 via the valve body 40 (due to an advance motion of the movable wall 16, 18) upon actuation of only the brake booster by means of the electromagnetic actuation means 90 without moving the brake pedal and thus the actuation member 38, and to thereby ensure that a pressure difference in the chamber 24, 26 can be built up, as will be described later.

On the one hand, the closing sleeve 106 comprises an outer seal 108 for sealing in the control housing 30 and, on the other hand, an inner sealing surface 110 which can be brought into a sealing engagement with another (in addition to the valve seat 32) sealing edge 112 in order to close the connecting duct between the two chambers 24, 26 of the brake booster 10.

As already mentioned above, the closing sleeve 106 is coupled with the support ring 54 via a step 114 in the inner wall of the closing sleeve 106 and is biased by the spring 62.

A rubber seal 116 is vulcanized onto the rear area of the sleeve. The closing sleeve 106 is maintained in its initial position by the spring 76 of the sleeve 72. The spring 62 which acts in the opposite direction is weaker.

In the following, the electromagnetic actuation of the valve assembly will be described.

Upon the excitation of the solenoid 92 of the electromagnetic actuation means 90, the armature 94, which is rigidly connected with the actuation member 38, will not be moved, but rather the housing 96 of the solenoid is moved relative to the armature, i.e. to the left in FIG. 2. This causes the sleeve 72 to be moved against the spring 76 (to the left) via the retaining ring 98.

The closing sleeve 106 which is biased by the spring 62 together with the rubber seal 116 follows the opening movement of the sleeve 72.

The closing sleeve 106 can follow the movement of the sleeve 72 until its inner sealing surface 110 abuts the sealing edge 112 of the control housing 30 and comes into a sealing engagement with it. Now the closing sleeve 106 can clear the rubber seal 116 and make a connection to the ambient atmosphere (via the duct 104 and the opening 102). The air which therefore enters from the outside now causes a pressure increase in the rear chamber 26 of the brake booster 10 and consequently a movement of the wall 16, 18 (to the left in FIG. 2) for a power transmission by means of the power output member 89.

As mentioned above, the actuation member 38 of the brake booster has not yet been moved by means of the brake pedal. The actuation member 38 can only follow the forward movement of the movable wall 16, 18 upon the abutment of the transmission member 82 (herein designed as a cross bar) at the control housing 30. During this drag phase, the contact of the valve body 40 at the inner valve seat 34 opens the vacuum connection 109 between the two chambers 24, 26 which, without any further action, would result in a communication between the two chambers and a pressure compensation which, of course, has to be prevented. The connecting duct 109 is therefore closed by the closing sleeve 106 before a communication between the chambers 24, 26 can be made. An unimpeded build-up of a pressure difference is thus enabled between the chambers 24, 26.

In this manner, the brake booster can be actuated fully automatically without actuating the brake pedal solely by activating the electromagnetic actuation means 90. If the automatic, electromagnetic-pneumatic braking operation is to be terminated, the current supply of the solenoid 92 is interrupted. The spring 76 then moves the sleeve 72 and, via the rubber seal 116, the closing sleeve 106 against the force of the spring 62 to the right into its initial position. This reopens the connection 109 between the chambers 24, 26, a pressure compensation takes place between the chambers which again renders the brake booster 10 ineffective.

The above-described construction of the brake booster, including the additional electromagnetic actuation means 90, enables a number of advantageous control functions of the braking system of a vehicle which is equipped with First, it is possible to provide an automatic speed control for the vehicle equipped with the braking system (a so-called "cruise control") by means of the activation of the electromagnetic actuation means 90 independent of an actuation of the brake pedal by the driver.

Additionally, it is possible to improve a so-called emergency or panic braking operation. If the brake pedal is pressed by the driver with a relatively high velocity (a velocity above a given threshold value), it can be derived that a so-called emergency braking situation prevails. In such an emergency braking situation it is mandatory that the maximum action of the brake booster be achieved. If an emergency braking situation is detected because a given limit of the actuation velocity of the pedal has been exceeded, then an electronic controller of the braking system controls the electromagnetic actuation means 90 in the described manner in order to open the valve seat 66 and thereby to introduce auxiliary pressurized air into the rear chamber 26. The brake booster is actuated both by the activation of the actuation member 38, as well as by the excitation of the electromagnetic actuation means 90. An extremely rapid braking pressure build-up is achieved.

Additionally, it is possible to achieve an optimum braking operation in various situations by means of the described electromagnetic actuation means 90. If, for example, the same braking deceleration is to be obtained with the same brake pedal actuations even with different loading conditions of the motor vehicle, the braking system must be adjusted as a function of the vehicle weight. This is made possible by the described electromagnetic actuation means 90. It is possible, for example, to measure the force applied by the driver to the brake pedal during a braking operation and, at the same time, to measure the achieved braking deceleration. In the case of a heavily loaded vehicle, the braking deceleration will be smaller than in the case of a vehicle which is only lightly loaded. With the same variation with time of the pedal forces, the deceleration sensor generates a signal which, in the case of a heavily loaded vehicle, is different from that of a vehicle which is lightly loaded. In response to this signal the electronic controller of the braking system can then control the electromagnetic actuation means 90 in such a manner that with the same variation with time of the pedal force the same braking deceleration is obtained. This means that in the case of a heavily loaded vehicle the electromagnetic actuation means is more rapidly and more effectively employed than in the case of an only lightly loaded vehicle.

I claim:

1. A valve assembly for controlling a pneumatic brake booster (10) with a control housing (30) in which a first and a second valve seat (32, 34) are arranged, and with a valve body (40) which can contact one of the two valve seats (32, 34) and which in one position of an actuation member (38) is lifted off the first valve seat (32) only, whereby two chambers (24, 26) of the brake booster (10) are connected with each other and are both separated from an air inlet (50), and in another position of the actuation member (38) is lifted off the second valve seat (34), whereby the two chambers (24, 26) are separated from each other and one of them is connected with the air inlet (50), and with an additional valve (30, 116) with an annular third valve seat (66) which is arranged outside of the control housing (30), and a sleeve (72) which encompasses the control housing (30) at a radial distance and is axially movable with respect to same and which is biased in the direction of the third valve seat (66) and forms an additional ventilation duct (80) to one of the two chambers, characterized in that the sleeve (72) is movable by means of an electromagnetic actuation means (90) for opening of the third valve seat (66).

2. A valve assembly according to claim 1, characterized in that the electromagnetic actuation means (90) comprises an armature (94) which is coupled with the actuation member (38) of the brake booster (10).

3. A valve assembly according to claim 1, characterized in that a solenoid (92) of the electromagnetic actuation means (90) concentrically encompasses the actuation member (38) of the brake booster (10) and that a housing (96) of the solenoid (92) is movable relative to the actuation member (38) for moving the sleeve (72).

4. A valve assembly according to claim 1, characterized in that a closing sleeve (106) is arranged in the control housing (30) which prevents a ventilation of the other of the two chambers (24) of the brake booster upon an opening of the third valve seat (66) by means of the electromagnetic actuation means (90).

5. A valve assembly according to claim 4, characterized in that the closing sleeve (106) comprises an outer seal (108) for sealing against the inner surface of the sleeve (72)and an inner sealing surface (110)which can be brought into a sealing engagement with a sealing edge (112) in order to close a connecting duct between the two chambers (24, 26) of the brake booster (10).

6. A valve assembly according to claim 5, characterized in that the closing sleeve (106) is coupled with a support ring (54) via a step (114) in the inner wall of the closing sleeve (106) and is biased by a spring (62).

* * * * *